US009848291B2

(12) United States Patent
Myers et al.

(10) Patent No.: US 9,848,291 B2
(45) Date of Patent: Dec. 19, 2017

(54) SYSTEM AND METHOD FOR LOCATION-BASED SECURITY

(71) Applicant: BOOZ ALLEN & HAMILTON, McLean, VA (US)

(72) Inventors: Gary Jason Myers, Fairfax, VA (US); Matthias Welsh, Washington, DC (US); Robert Wayne Knight, II, Kenmore, WA (US); Timothy Schaefer, Rochester, MN (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 14/858,351

(22) Filed: Sep. 18, 2015

(65) Prior Publication Data

US 2016/0088432 A1 Mar. 24, 2016

Related U.S. Application Data

(60) Provisional application No. 62/052,321, filed on Sep. 18, 2014.

(51) Int. Cl.
H04W 4/02 (2009.01)
G06K 7/10 (2006.01)
G06F 1/28 (2006.01)

(52) U.S. Cl.
CPC ............ H04W 4/02 (2013.01); G06F 1/28 (2013.01); G06K 7/10366 (2013.01)

(58) Field of Classification Search
CPC ........ H04W 4/02; G06F 1/28; G06K 7/10366
(Continued)

(56) References Cited

U.S. PATENT DOCUMENTS 5,517,194 A * 5/1996 Carroll .................. G01S 13/325
340/10.34
5,821,854 A * 10/1998 Dorinski ................. G06F 21/35
340/10.5
(Continued)

FOREIGN PATENT DOCUMENTS

KR 10-1246343 B1 3/2013
WO 2014063082 A1 4/2014

OTHER PUBLICATIONS

Notification of Transmittal of the International Search Report (Forms PCT/ISA/220 and Forms PCT/ISA/210) and the Written Opinion of the International Searching Authority (Forms PCT/ISA/237) dated Jan. 4, 2016, by the Korean Intellectual Property Office in corresponding International Application No. PCT/US2015/050928. (10 pgs).

Primary Examiner — Edwin Holloway, III
(74) Attorney, Agent, or Firm — Buchanan Ingersoll & Rooney PC

(57) ABSTRACT

A mobile computing device, including: a first memory device having first computer-readable instructions tangibly recorded thereon; a first hardware processor configured to execute the first computer-readable instructions recorded on the first memory device; and an RFID component that includes a transceiver configured to receive a proximity signal from at least one RFID reader when the RFID component is within a predetermined range of the at least one RFID reader, and a second memory device configured to store the proximity signal, wherein the first hardware processor is configured to, upon executing the instructions recorded on the first memory device, control at least one operation of the mobile computing device in accordance with the proximity signal received by the transceiver of the RFID component from the at least one RFID reader.

25 Claims, 10 Drawing Sheets

(58) Field of Classification Search
USPC .......................................................... 340/5.2
See application file for complete search history.

(56) References Cited

U.S. PATENT DOCUMENTS

| | | | | |
|---|---|---|---|---|
| 5,874,902 | A * | 2/1999 | Heinrich | G08B 13/1409 |
| | | | | 340/10.5 |
| 8,618,913 | B1 * | 12/2013 | Bailey | H04W 12/08 |
| | | | | 340/10.1 |
| 2004/0056759 | A1 * | 3/2004 | Ungs | G08B 13/1409 |
| | | | | 340/5.74 |
| 2004/0263319 | A1 * | 12/2004 | Huomo | G06K 19/0716 |
| | | | | 340/10.2 |
| 2005/0037707 | A1 * | 2/2005 | Lewis | H04B 5/0062 |
| | | | | 455/41.1 |
| 2005/0206353 | A1 * | 9/2005 | Sengoku | G06F 21/78 |
| | | | | 323/210 |
| 2006/0107307 | A1 * | 5/2006 | Knox | H04L 63/0492 |
| | | | | 726/2 |
| 2006/0132304 | A1 * | 6/2006 | Cabell | G06F 21/88 |
| | | | | 340/539.23 |
| 2007/0164847 | A1 * | 7/2007 | Crawford | G06F 21/35 |
| | | | | 340/5.61 |
| 2008/0204199 | A1 * | 8/2008 | Howarth | G08B 13/2417 |
| | | | | 340/10.1 |
| 2009/0210940 | A1 | 8/2009 | Dean | |
| 2010/0011211 | A1 | 1/2010 | Anemikos et al. | |
| 2011/0241844 | A1 | 10/2011 | Wolf | |
| 2014/0361872 | A1 * | 12/2014 | Garcia | H04B 5/0031 |
| | | | | 340/5.74 |

* cited by examiner

SYSTEM AND METHOD FOR LOCATION-BASED SECURITY

CROSS-REFERENCE TO RELATED APPLICATIONS

This application claims the benefit of U.S. Provisional Application No. 62/052,321, filed on Sep. 18, 2014, the contents of which are incorporated herein by reference in their entirety.

FIELD

The present disclosure relates to a system and method for enabling and controlling the operation and/or execution of certain hardware and software components of a mobile computing device according to information obtained based on the use of radio frequency identification (RFID).

BACKGROUND

Known RFID implementations are built around the concept of tracking the physical location of an asset (e.g., a product such as a mobile computing device) having an RFID tag affixed thereto. The RFID tag is read by a radio frequency (RF) reader. In this scenario, the asset is not self-aware of its RFID-based location as all location information is exchanged between the RFID tag and the RFID reader(s).

SUMMARY

An exemplary embodiment of the present disclosure provides a mobile computing device, including: a first memory device having first computer-readable instructions tangibly recorded thereon; a first hardware processor configured to execute the first computer-readable instructions recorded on the first memory device; and an RFID component that includes a transceiver configured to receive a proximity signal from at least one RFID reader when the RFID component is within a predetermined range of the at least one RFID reader, and a second memory device configured to store the proximity signal, wherein the first hardware processor is configured to, upon executing the instructions recorded on the first memory device, control at least one operation of the mobile computing device in accordance with the proximity signal received by the transceiver of the RFID component from the at least one RFID reader.

An exemplary embodiment of the present disclosure provides a method for controlling at least one operation of a mobile computing device, the method including: receiving, by a transceiver of an RFID component, a proximity signal from at least one RFID reader when the RFID component is within a predetermined range of the at least one RFID reader; storing the proximity signal in a first memory device of the RFID component; and executing, by a first hardware processor of the mobile computing device, first computer-readable instructions tangibly recorded on a second memory device of the mobile computing device, the executed instructions controlling the at least one operation of the mobile computing device in accordance with the proximity signal received by the transceiver of the RFID component from the at least one RFID reader.

An exemplary embodiment of the present disclosure provides a non-transitory computer-readable storage medium storing instructions which, when executed by a hardware processor of a mobile computing device, cause the hardware processor to perform a method for controlling at least one operation of the mobile computing device, the method including: receiving a proximity signal from a transceiver of an RFID component communicatively connected to the mobile computing device, the transceiver receiving the proximity signal when the RFID component is within a predetermined range of at least one RFID reader; and executing, by the hardware processor of the mobile computing device, the instructions stored on the non-transitory computer-readable storage medium of the mobile computing device, the executed instructions controlling the at least one operation of the mobile computing device in accordance with the proximity signal received by the transceiver of the RFID component from the at least one RFID reader.

An exemplary embodiment of the present disclosure provides a non-transitory computer-readable storage medium storing instructions which, when executed by a hardware processor located in an RFID component communicatively connected to a mobile computing device, cause the hardware processor to perform a method for controlling at least one operation of the mobile computing device, the method including: receiving, by a transceiver of the RFID component, a proximity signal when the RFID component is within a predetermined range of at least one RFID reader; storing the proximity signal in the non-transitory computer-readable storage medium of the RFID component, the non-transitory computer-readable storage medium of the RFID component having a control policy for the mobile computing device, the control policy including identifications of operations of the mobile computing device which are performable based on the received proximity signal; comparing the proximity signal to the control policy, determining which operations of the mobile computing device are permitted to be performed based on the comparison, and generating an operation signal identifying the operations of the mobile computing device which are determined to be performable; and transmitting the operation signal, to a second hardware processor of the mobile computing device, to control at least one operation of the mobile computing device in accordance with the operation signal transmitted to the mobile computing device.

These and other features and advantages of particular embodiments of the system and method for location-based security will now be described by way of exemplary embodiments to which they are not limited.

BRIEF DESCRIPTION OF THE DRAWINGS

The scope of the present disclosure is best understood from the following detailed description of exemplary embodiments when read in conjunction with the accompanying drawings. The following figures are included in the drawings.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

This description provides exemplary embodiments only, and is not intended to limit the scope, applicability or configuration of the mobile computing device, system, and method for location-based security of the present disclosure. Rather, the ensuing description of the embodiments will provide those skilled in the art with an enabling description for implementing embodiments of the mobile computing device, system, and method of the present disclosure. Various changes may be made in the function and arrangement of elements without departing from the spirit and scope of the disclosure as set forth in the appended claims. Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

Figure 1:
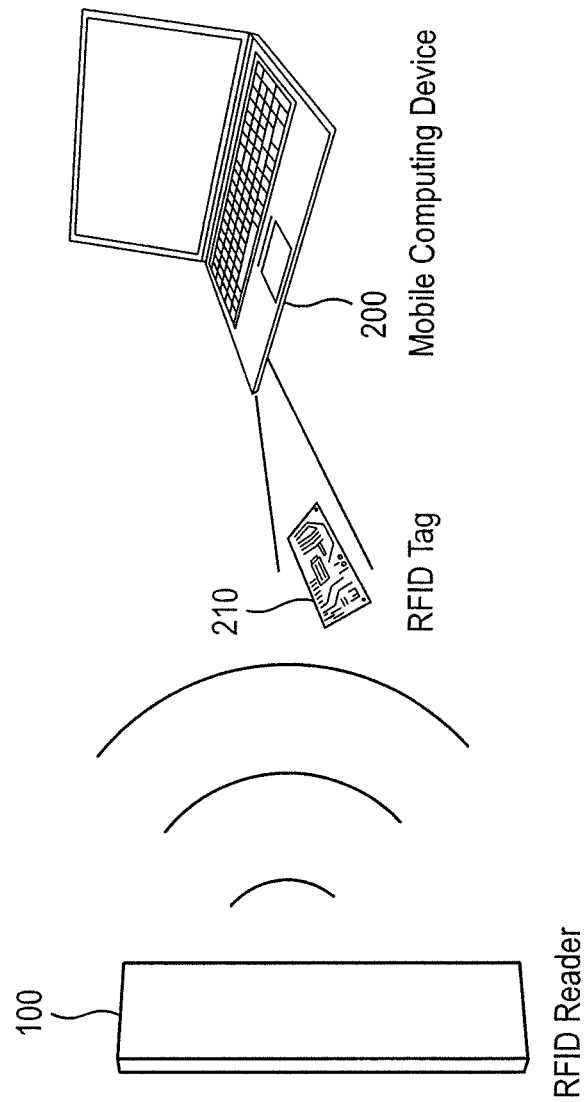
FIG. 1 illustrates a diagram of a system architecture that may be employed in accordance with an exemplary embodiment.
Figure 2:
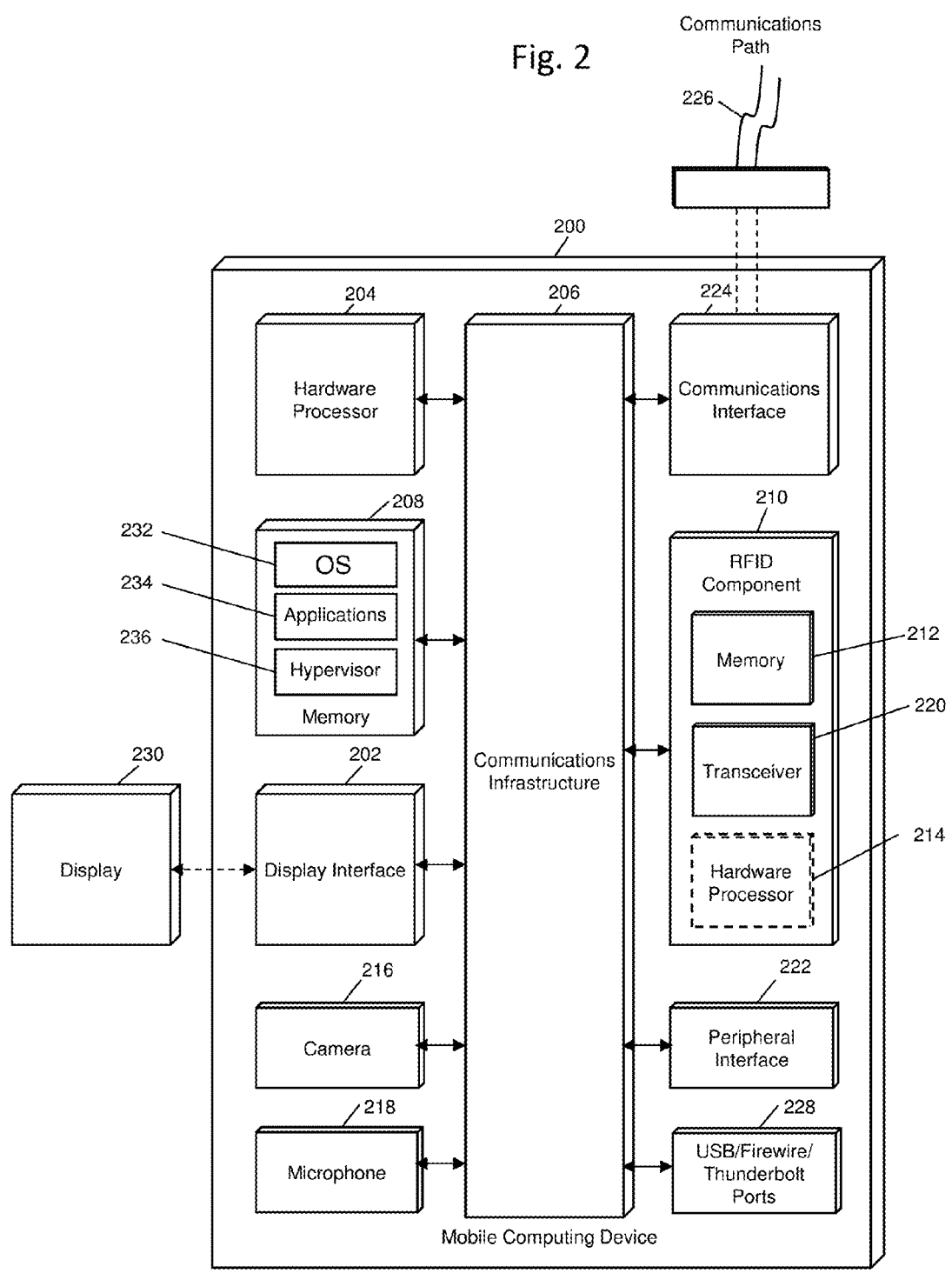
FIG. 2 is a block diagram illustrating the hardware architecture of a mobile computing device in accordance with an exemplary embodiment.

With reference to FIGS. 1 and 2, exemplary embodiments of the present disclosure provide a system and method of location-based security, in which RFID components 210 (e.g., RFID tags) removably or fixedly affixed to a mobile computing device 200 comprise microcontrollers (e.g., at least one hardware processor), and the communications infrastructure 206 (e.g., internal and external serial buses) of mobile computing devices 200 exchange location information between the RFID components 210 and the firmware and operating system(s) 232 of the mobile computing device 200. As used herein, a mobile computing device 200 includes at least one hardware processor 204 configured to execute computer-readable programs and an operating system 232 tangibly recorded on a non-transitory computer-readable recording medium ("memory") 208 (e.g., ROM, hard disk drive, optical memory, flash memory, etc.). Examples of a mobile computing device 200 include a laptop, tablet computer, smartphone, etc. as known in the art.

FIG. 1 is a block diagram of components of a system for location-based security according to an exemplary embodiment of the present disclosure. In FIG. 1, the mobile computing device 200 is shown as having an RFID component 210 affixed thereto. The RFID component 210 may be removably or fixedly affixed to the mobile computing device 200. For example, the RFID component 210 may be comprised within the housing containing the electronic circuitry of the mobile computing device 200. In an exemplary embodiment, the RFID component 210 may have its own hardware processor 214 separate from the hardware processor(s) of the mobile computing device 200. In addition, the RFID component 210 has its own non-transitory memory 212 (e.g., ROM, hard disk drive, optical memory, flash memory, etc.) separate from the memory 208 of the mobile computing device 200, and a transceiver 220. In an exemplary embodiment, the RFID component 210 does not have its own hardware processor 214, but contains the memory 212 and the transceiver 220. The RFID component 210 may be passive, active, or battery-assisted passive. An active RFID component 210 has an on-board battery and periodically transmits a signal containing a data message (the message can include, e.g., identification information of the RFID component, etc.). A battery-assisted passive RFID component 210 has a small battery on board and is activated when in the presence of an RFID reader 100. A passive RFID component 210 is cheaper and smaller because it has no battery; instead, the RFID component 210 uses the radio energy transmitted by the RFID reader 100. The RFID component 210 contains at least two parts: an integrated circuit for storing and processing information, modulating and demodulating a radio-frequency (RF) signal, collecting DC power from the incident reader signal, and other specialized functions; and a transceiver 220 (e.g., antenna) for receiving and transmitting the signal. In an exemplary embodiment, the transceiver 220 can include two antennas in different polarizations such as linear and circular or horizontal and vertical. A single antenna can also be used. The RFID component 210 can operate, for example, in a frequency range between 860 and 960 MHz. The sensitivity of the antenna is important to the operation of the RFID component 210, and a minimum receive gain of the antenna greater than −2 dB should be maintained to ensure proper operation. In an exemplary embodiment, the antenna provides a roughly omni-directional radiation pattern. Due to regional banding of the ~900 MHz ISM frequency space, the antenna(s) may be regionally designed. For instance, the North American ISM band is 902-928 MHz. With a transmitter at 28 dBm complying with FCC and UHF RFID Gen2 Specifications, this should yield a free space range of approximately 20 meters.

Figure 3:
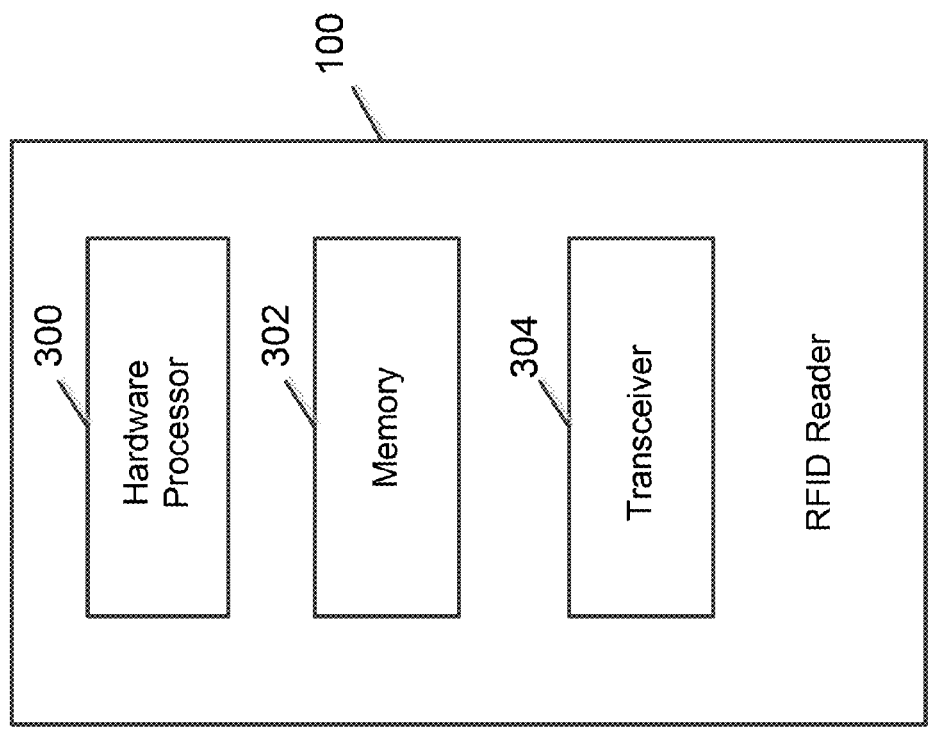
FIG. 3 is a block diagram illustrating the architecture of a RFID reader in accordance with an exemplary embodiment.

The RFID component 210 information (i.e. tag information) is stored in a non-volatile memory, e.g., memory 212. The RFID component 210 includes either fixed or programmable logic for processing the transmission and sensor data, respectively. In an exemplary embodiment, the RFID component 210 includes an Impinj MonzaX-8K Dura RFID integrated circuit or similar integrated circuit. FIG. 1 illustrates only one RFID reader 100 and RFID component 210 for clarity of illustration. However, it is to be understood that several RFID readers 100 may be equipped in a room or other area to which the mobile computing device may be carried. An RFID reader 100 transmits a radio signal, which may be encoded, to interrogate the RFID component 210. The RFID component 210 receives the message from the RFID reader 100 and then responds with its identification information. FIG. 3 shows an exemplary architecture of an RFID reader 100. The RFID reader 100 contains a non-transitory memory device 302 that can store the proximity signal (which can include the location data and/or a control policy), a hardware processor (e.g., CPU) 300, and a transceiver 304.

The RFID reader(s) 100 send a proximity signal (e.g., location-related information includes, for example, geographic coordinates, configured zones, and/or proximity information)) to the RFID component 210 embedded within or affixed to the mobile computing device 200, indicating the defined physical location of the RFID reader(s) 100 and/or the mobile computing device 200. The location information can be transmitted to the RFID component 210 while the mobile computing device 200 is in both the powered-on and powered-off states. The message stored in the RFID component's memory 212 is accessed by the hardware processor 214 of the RFID component 210. The hardware processor 214 serves three functions: 1) processes the location information provided by the RFID component 210 against corresponding control or management policies to determine the appropriate power state for the mobile computing device 200; 2) communicate with the power controls of the mobile computing device 200 to manage power states (e.g., force power off, enable power on, and disable power on); and 3) pass the location information to the mobile computing device's serial buses 206. In an exemplary embodiment, the RFID reader 100 can adjust its transmission frequency to avoid standard frequencies.

FIG. 2 is a block diagram illustrating a mobile computing device 200 architecture in accordance with an exemplary embodiment. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A hardware processor device as discussed herein may be a single hardware processor, a plurality of hardware processors, or combinations thereof. Hardware processor devices may have one or more processor "cores." The terms "computer program medium," "non-transitory computer readable medium," and "computer usable medium" as discussed herein are used to generally refer to tangible media such as a memory device 208, a memory device 212, and a memory device 303.

Various embodiments of the present disclosure are described in terms of this exemplary mobile computing device 200. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Hardware processor 204 may be a special purpose or a general purpose processor device. Hardware processor 214 may be a special purpose or a general purpose processor device. Similarly, hardware processor 300 may be a special purpose or a general purpose processor device. The hardware processor device 204 may be connected to a communication infrastructure 206, such as a bus, message queue, network, multi-core message-passing scheme, etc. The network may be any network suitable for performing the functions as disclosed herein and may include a local area network (LAN), a wide area network (WAN), a wireless network (e.g., Wi-Fi), a mobile communication network, a satellite network, the Internet, fiber optic, coaxial cable, infrared, radio frequency (RF), or any combination thereof. Other suitable network types and configurations will be apparent to persons having skill in the relevant art. The mobile computing device 200 may also include a memory 208 (e.g., random access memory, read-only memory, etc.), and may also include a memory 212. The memory 208 and the memory 212 may be read from and/or written to in a well-known manner. In an embodiment, the memory 208 and the memory 212 (and memory 302) may be non-transitory computer readable recording media.

Data stored in the mobile computing device 200 (e.g., in the memory 208 and the memory 212) may be stored on any type of suitable computer readable media, such as optical storage (e.g., a compact disc, digital versatile disc, Blu-ray disc, etc.), magnetic tape storage (e.g., a hard disk drive), or solid-state drive. An operating system 232, one or more applications 234, and one or more hypervisors 236 can be stored in the memory 208.

In an exemplary embodiment, the data may be configured in any type of suitable database configuration, such as a relational database, a structured query language (SQL) database, a distributed database, an object database, etc. Suitable configurations and storage types will be apparent to persons having skill in the relevant art.

The mobile computing device 200 may also include a communications interface 224. The communications interface 224 may be configured to allow software and data to be transferred between the mobile computing device 200 and external devices. Exemplary communications interfaces 224 may include a modem, a network interface (e.g., an Ethernet card), a communications port, a PCMCIA slot and card, etc. Software and data transferred via the communications interface 224 may be in the form of signals, which may be electronic, electromagnetic, optical, or other signals as will be apparent to persons having skill in the relevant art. The signals may travel via a communications path 226, which may be configured to carry the signals and may be implemented using wire, cable, fiber optics, a phone line, a cellular phone link, a radio frequency link, etc.

Computer program medium and computer usable medium may refer to memories, such as the memory 208 and the memory 212, which may be memory semiconductors (e.g., DRAMs, etc.). These computer program products may be means for providing software to the mobile computing device 200. Computer programs (e.g., computer control logic) may be stored in the memory 208 and/or the memory 212. Computer programs may also be received via the communications interface 224. Such computer programs, when executed, may enable mobile computing device 200 to implement the present methods as discussed herein. In particular, the computer programs, when executed, may enable hardware processor device 204 to implement the method illustrated by FIGS. 4-6 and 10, or similar methods, as discussed herein. Accordingly, such computer programs may represent controllers of the mobile computing device 200. Where the present disclosure is implemented using software, the software may be stored in a computer program product or non-transitory computer readable medium and loaded into the mobile computing device 200 using a removable storage drive or communications interface 224.

The mobile computing device 200 may also include various hardware devices, such as a camera 216, a microphone 218, a peripheral interface 222, and input/output ports 228 such as USB, firewire, thunderbolt ports, etc. As described in greater detail below, the RFID component 210 may be located within and integrated with the mobile computing device 200, or the RFID component 210 can be external to the mobile computing device 200 and connected thereto by a signal transmission means such as a wire(s), wireless communications, etc.

Lastly, the mobile computing device 200 may also include a display interface 202 that outputs display signals to a display unit 230, e.g., LCD screen, plasma screen, LED screen, DLP screen, CRT screen, etc.

According to an exemplary embodiment, the location information provided through the mobile computing device's buses 206 can be integrated with either a hypervisor 236 or a native operating system 232 using a device driver.

Hypervisors 236 allow for the control of hardware of the mobile computing device 200 and guest virtual machines. Location-based security can be integrated in the hypervisor control domain directly or be installed as a guest virtual machine that interfaces with the hypervisor control domain.

Location-based security can be configured with rules to manage the hypervisor control domain using the desired automated response associated with various defined locations. Virtual machines, network interface cards, device power, USB ports, cameras, microphones, and other device hardware can be enabled or disabled based on defined policy rules.

The hypervisor 236 is configured to further distribute the location information to guest virtual machines running on the host machine.

The operating system(s) 232 of the mobile computing device 200 can receive RFID-based location information from either the serial buses 206 directly, if running as a native operating system 232, or as a pass-through from the hypervisor 236, if running on a guest virtual machine. The location-based security techniques of the present disclosure integrate with the operating system(s) 232 to control access to device hardware and device power states using the defined policy rules. Access to one or more applications 234 and one or more files stored or running on the operating system(s) 232 are also enabled or disabled using the device management functionality of the location-based security system and method of the present disclosure. A file can be, for example, a document, picture, video, database records, etc.

Figure 8:
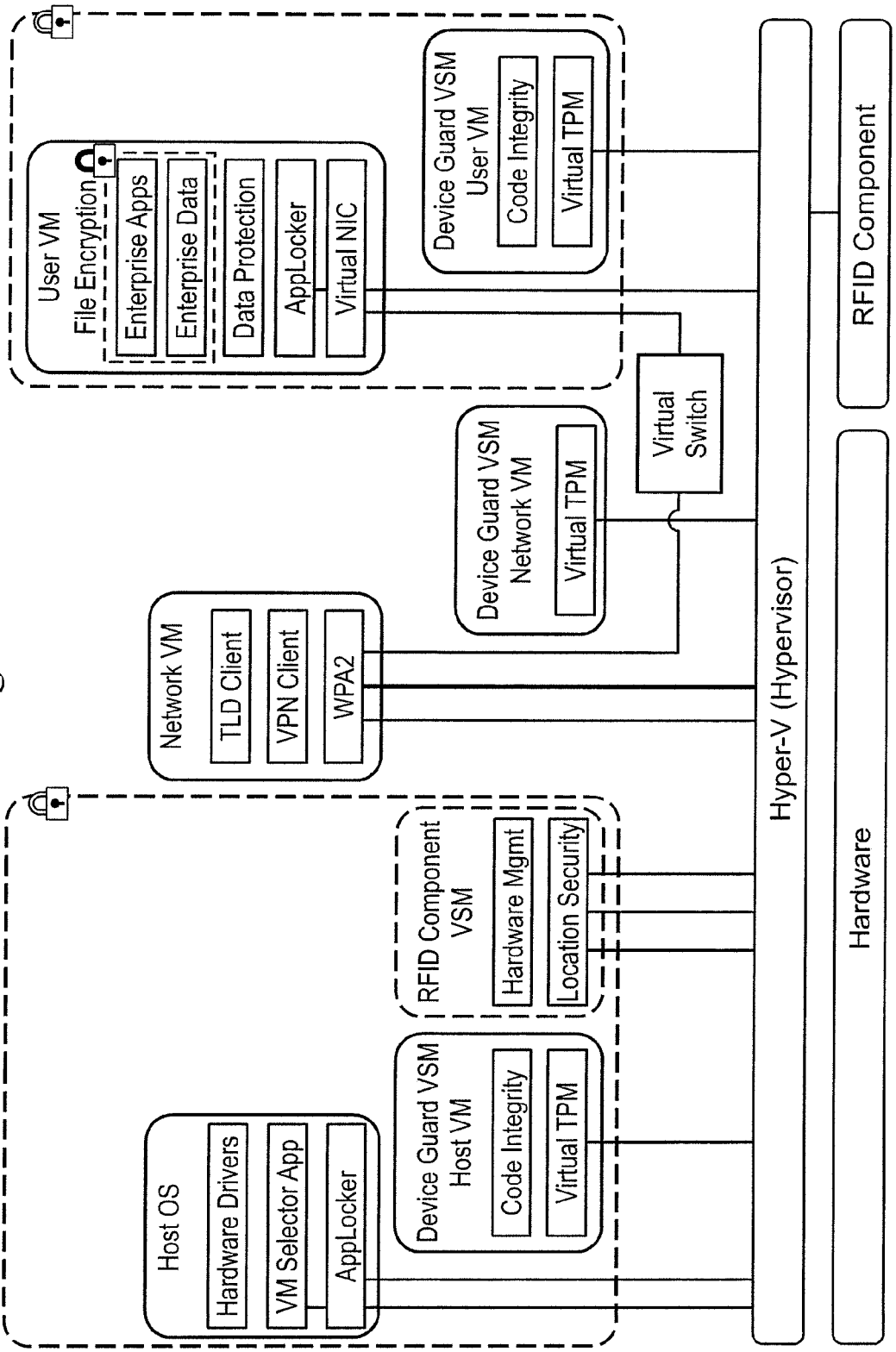
FIG. 8 is a block diagram illustrating an exemplary architecture using a hypervisor.

FIG. 8 is a block diagram illustrating a hypervisor in accordance with an exemplary embodiment. The present disclosure leverages Hyper-V, for example, as its type 1 hypervisor. The exemplary architecture of FIG. 8 allows for multiple User VMs to be run in the future. The hypervisor is used to isolate the user VMs from hardware as defined in the control policy, ensure a secure networking environment and cryptographically isolate VMs from each other. In the exemplary architecture of FIG. 8, a network VM can encapsulate both of the layers of encryption and have direct access to the network interface.

Figure 9:
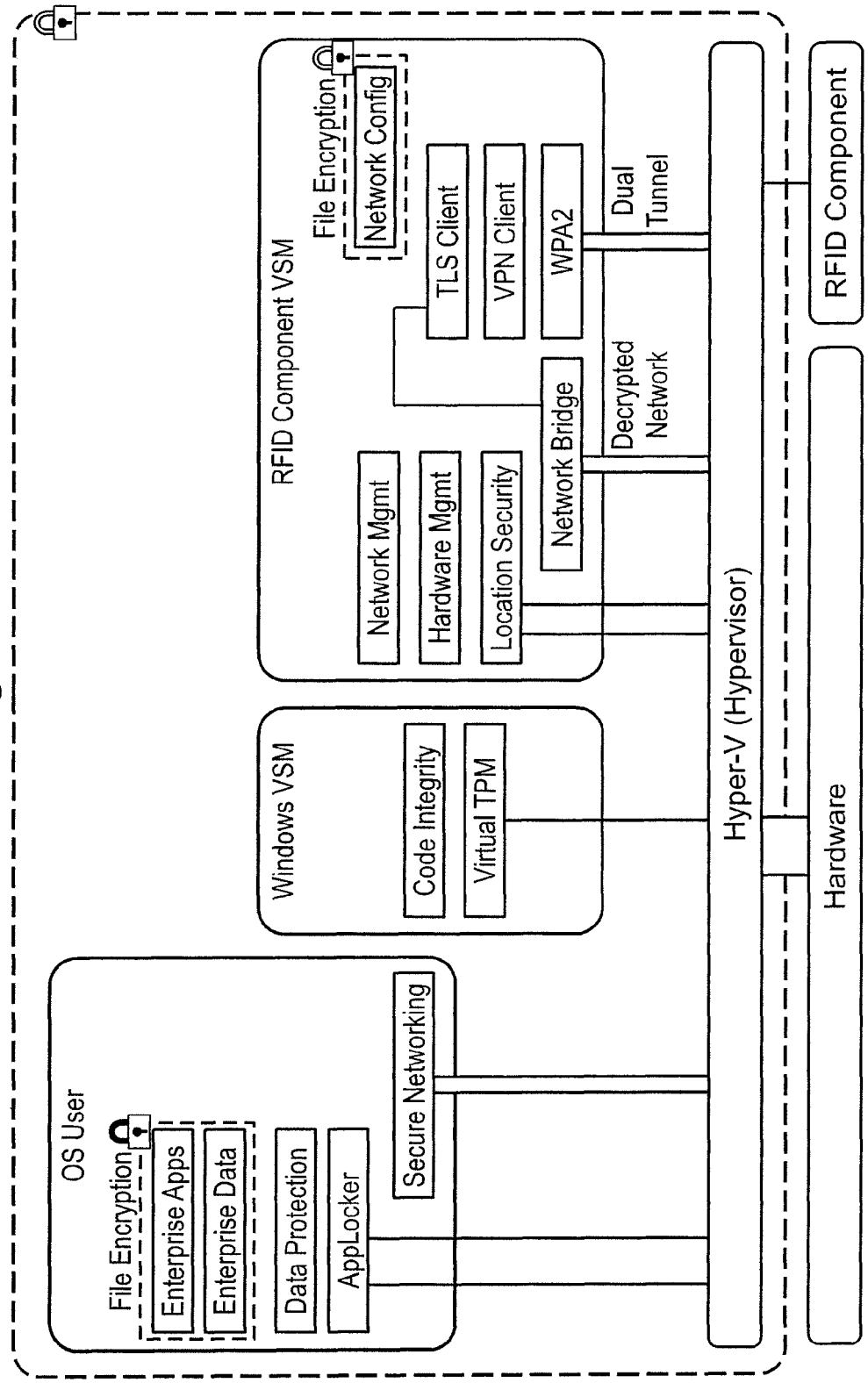
FIG. 9 is a block diagram illustrating an exemplary architecture using a hypervisor.

FIG. 9 is a block diagram illustrating an exemplary architecture in which virtual systems management (VSM) can be used to dynamically manage hardware available to the User OS (USB devices, webcam, microphone, Bluetooth, etc.) and provide secure networking based on the policy issued over RFI D.

In an exemplary embodiment shown in FIG. 2, the mobile computing device 200 includes the memory device 208 having computer-readable instructions tangibly recorded thereon. The mobile computing device 200 can also include a hardware processor 204 configured to execute the computer-readable instructions recorded on the memory device 208. The mobile computing device 200 can also include an RFID component 210 that includes a transceiver 220 (e.g., an antenna) configured to receive a proximity signal from at least one RFID reader 100 when the RFID component 210 is within a predetermined range (e.g., within a couple feet or meters) of the at least one RFID reader 100. The predetermined range can be configured based on (1) the processing and/or telecommunication capabilities of the mobile computing device 200, RFID component 210 and/or RFID reader(s) 100, and/or (2) based on selectable distances (e.g., 10 feet, 20 feet, 30 feet) for specific control objectives, and/or (3) location restrictions such as the physical size of a room, building, or segment of a building (e.g., the second floor of the building). The mobile computing device 200 can also include a memory device 212 configured to store the proximity signal. In an exemplary embodiment, the hardware processor 204 is configured to, upon executing the instructions recorded on the memory device 208, control at least one operation of the mobile computing device 200 in accordance with the proximity signal received by the transceiver 220 of the RFID component 210 from the at least one RFID reader 100.

In an exemplary embodiment, the hardware processor 204 is configured to control at least one of: (1) at least one hardware component (e.g., memory device 208, display interface 202, camera 216, microphone 218, peripheral interface 222, communications interface 224, ports 228, etc.) of the mobile computing device 200; (2) at least one operating system 232 recorded on the memory device 208; (3) at least one hypervisor 236 recorded on the memory device 208; and (4) at least one application program 234 executable on the mobile computing device 200.

In an exemplary embodiment, the proximity signal includes a control policy including identifications of operations of the mobile computing device 200 that are performable (e.g., by the mobile computing device 200). For example, according to the control policy, the hardware processor 204 is configured to enable or disable access to at least one of an executable application 234 stored in the memory device 208, a file stored in the memory device 208, at least one operating system 232 of the mobile computing device 200, and a peripheral hardware component (e.g., external hard drive, server, external disk drive, etc.) with which the mobile computing device 200 is configured to communicate. That is, when the mobile computing device 200 is within a certain range of the RFID reader 100, the hardware processor 300 causes the transceiver 304 to send the proximity signal, which includes the control policy, to the RFID component 210. Because the control policy identifies which operations, devices, files, or applications can be accessed and/or used by the mobile computing device 200, the hardware processor 204 is able to control the operations and/or access to devices, files, applications, etc. of the mobile computing device 200 in accordance with the control policy that was received. In an exemplary embodiment, a server can store multiple control policies for individual RFID readers 100 and/or mobile computing devices 200, and each control policy can be sent to the appropriate RFID reader 100 to which the control policy applies. The control policies can be updated on the server, and the updated control policies can be pushed by the server to the appropriate RFID readers 100. When an RFID reader receives its intended control policy, it is saved in the memory 302 of the RFID reader 100 where it can subsequently be transmitted to the RFID component 210 of the mobile computing device 200 by the transceiver 304.

In an exemplary embodiment, the proximity signal includes location-related data indicating a current physical location of at least one of the RFID component 210 and the at least one RFID reader 100. In an exemplary embodiment, the location-related data can identify the reader that transmitted the proximity signal (by name, MAC ID, serial number, code, room name, etc.). In an exemplary embodiment, the location-related data can identify a defined zone (i.e. an area of space in which the mobile computing device 200 is located). In an exemplary embodiment, the location-related data can be geographical coordinates.

In an exemplary embodiment, the memory device 208 has recorded thereon a control policy for the mobile computing device 200, the control policy including identifications of operations of the mobile computing device 200 which are performable based on the physical location of the mobile computing device 200. The hardware processor 204 is configured to compare the location-related data with the control policy, and determine which operations of the mobile computing device 200 are permitted to be performed based on the comparison.

In an exemplary embodiment, based on the comparison of the location-related data with the control policy, the hardware processor 204 is configured to control a power state of the mobile computing device 200. Exemplary power states include: power off, power on, sleep mode, hibernate mode, etc.

In an exemplary embodiment, based on the comparison of the location-related data with the control policy, the hardware processor 204 is configured to control access to at least one hardware component (e.g., memory device 208, display interface 202, camera 216, microphone 218, peripheral interface 222, communications interface 224, ports 228, etc.) of the mobile computing device 200.

In an exemplary embodiment, based on the comparison of the location-related data with the control policy, the hardware processor 204 is configured to enable or disable access to at least one of an executable application 234 stored in the memory device 208, a file stored in the memory device 208, at least one operating system 232 of the mobile computing device 200, and a peripheral hardware component with which the mobile computing device 200 is configured to communicate.

In an exemplary embodiment, the transceiver 220 of the RFID component 210 is configured to receive an update signal from at least one RFID reader 100, the update signal containing an update to at least one of the identifications included in the control policy recorded on the memory device 208. The hardware processor 204 is configured to update the control policy recorded in the memory device 208 in accordance with the update contained in the update signal.

In an exemplary embodiment, at least one of the control policy and the proximity signal are encrypted. Thus, the location data received from the RFID reader 100 can be encrypted. For example, the control policy and/or the proximity signal can be encrypted using an AES-256 GCM algorithm and signed with an ECDSA Curve P-385 signature or with a similar encryption scheme. In an exemplary embodiment, certificates for the ECDSA process are distributed as part of the system configuration and are assigned based on organizational region. Policy signatures can be generated, for example, on the message bytes 0 to 927. In an exemplary embodiment, encryption is performed on the entirety of the message bytes 0 to 1024 after the signature is generated. Pre-distributed key material unique to each RFID tag is stored in the device TPM and on a server. The key material is hashed with a NONCE that is part of the RFID transmission to generate individual session keys for each of the written policies. In an exemplary embodiment, a single policy can be used for both the UEFI/firmware of the mobile computing device 200 and operating system 232 of the mobile computing device 200, so both have cryptographic capabilities capable of decrypting the entire message and verifying the signature. Key storage can be handled in a TPM 2.0 capable TPM. In an exemplary embodiment, all messages of the RFID component 210 except for the NONCE(s) are encrypted, for example using the scheme above.

The messages used in the present disclosure can be stored on the memory device 212 of the RFID component 210. In an exemplary embodiment, the memory device 212 is 1,024 bytes in storage size, and stores the control policy along with a CRC16, ECDS curve P-384 generated signature and a 512 bit random NONCE unique to that configuration.

In an exemplary embodiment, as shown in FIG. 1, a system includes the mobile computing device 200, at least one least one RFID reader 100, and the RFID component 210. The at least one RFID reader 100 is configured to communicate wirelessly with the RFID component 210 of the mobile computing device 200 and transmit the proximity signal to the RFID component 210 of the mobile computing device 200 when the RFID component 210 is within the predetermined range. In an exemplary embodiment, at least one server is configured to transmit the update signal to the RFID reader 100 for updating the control policy recorded on the memory device 208 when the mobile computing device 200 is in communicative range with the RFID reader 100.

In an exemplary embodiment, a system includes the mobile computing device 200 and at least one RFID reader 100 configured to communicate wirelessly with the RFID component 210 of the mobile computing device 200 and transmit the proximity signal to the RFID component 210 of the mobile computing device 200 when the RFID component 210 is within the predetermined range.

In an exemplary embodiment, the memory device 212 has recorded thereon computer-readable instructions and a control policy for the mobile computing device 200, the control policy including identifications of operations of the mobile computing device 200 which are performable based on the location-related data of the received proximity signal.

In an exemplary embodiment, the RFID component 210 includes a hardware processor 214 configured to execute computer-readable instructions recorded on the memory device 212, compare the location-related data with the control policy, determine which operations of the mobile computing device 200 are permitted to be performed based on the comparison, and generate an operation signal identifying the operations of the mobile computing device 200 which are determined to be performable. The RFID component 210 is configured to transmit the operation signal to the hardware processor 204 of the mobile computing device 200, and the hardware processor 204 is configured to control at least one operation of the mobile computing device 200 in accordance with the operation signal received from the transceiver 220 of the RFID component 210.

In an exemplary embodiment, based on the operation signal received from the transceiver 220 of the RFID component 210, the hardware processor 204 is configured to control a power state of the mobile computing device 200.

In an exemplary embodiment, based on the operation signal received from the transceiver 220 of the RFID component 210, the hardware processor 204 is configured to control access to at least one hardware component (e.g., memory device 208, display interface 202, camera 216, microphone 218, peripheral interface 222, communications interface 224, ports 228, etc.) of the mobile computing device 200.

In an exemplary embodiment, based on the operation signal received from the transceiver 220 of the RFID component 210, the hardware processor 204 is configured to enable or disable access to at least one of an executable application 234 stored in the memory device 208, a file stored in the memory device 208, at least one operating system 232 of the mobile computing device 200, and a peripheral hardware component with which the mobile computing device 200 is configured to communicate.

In an exemplary embodiment, the transceiver 220 of the RFID component 210 is configured to receive an update signal from at least one RFID reader 100, the update signal containing an update to at least one of the identifications included in the control policy recorded in the memory device 212. The hardware processor 214 is configured to update the control policy recorded in the memory device 212 in accordance with the update contained in the update signal.

In an exemplary embodiment shown in FIG. 1, a system includes, for example, the mobile computing device 200, at least one RFID reader 100, and the RFID component 210. The at least one RFID reader 100 is configured to communicate wirelessly with the RFID component 210 of the mobile computing device 200 and transmit the proximity signal to the RFID component 210 of the mobile computing device 200 when the RFID component 210 is within the predetermined range. At least one server is configured to transmit the update signal to the at least one RFID reader 100 for updating the control policy recorded in the memory device 208 when the mobile computing device 200 is in communicative range with the at least one RFID reader 100.

Figure 10:
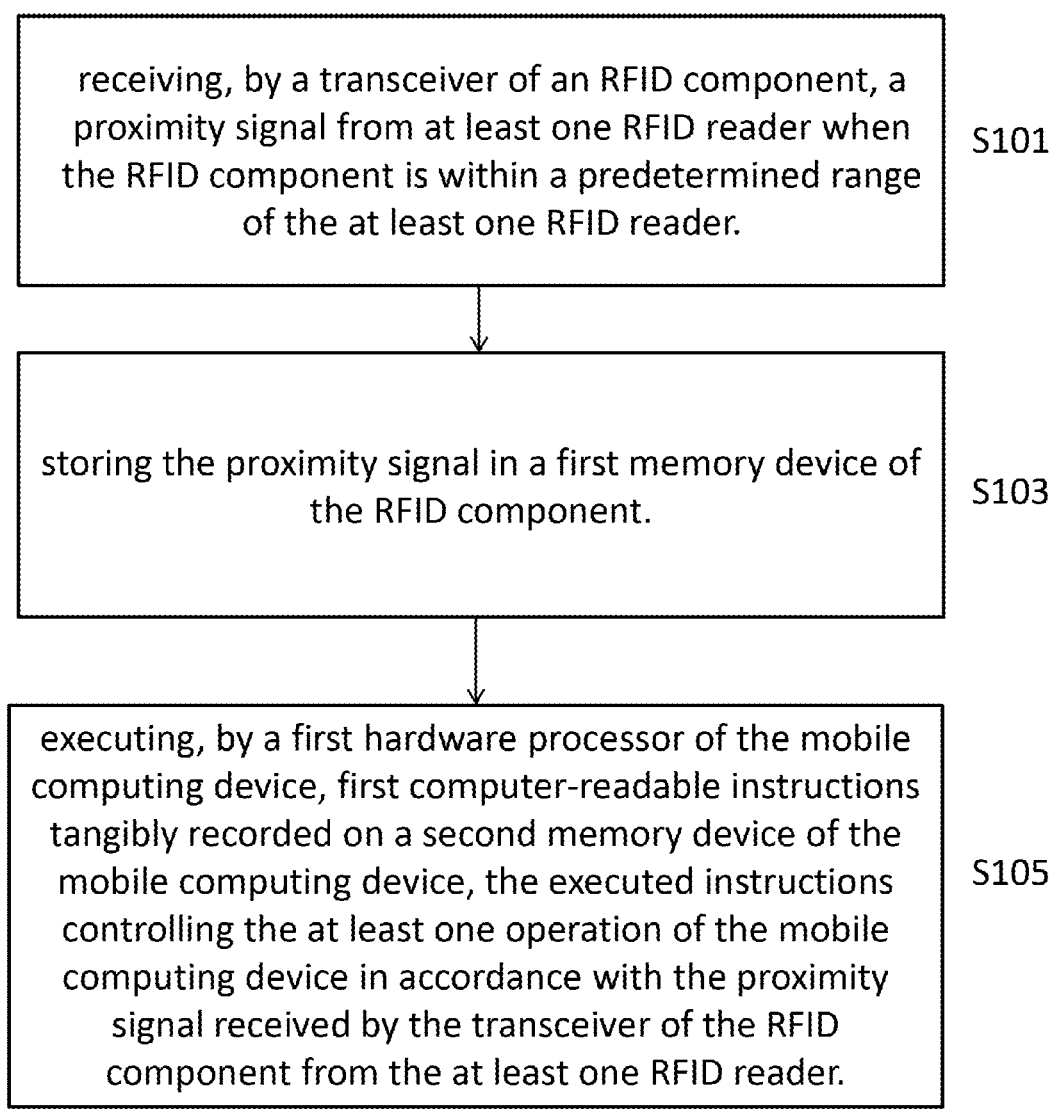
FIG. 10 is a flow chart illustrating a method according to an exemplary embodiment.

In an exemplary embodiment shown in FIG. 10, a method for controlling at least one operation of the mobile computing device 200 includes receiving, by the transceiver 220 of the RFID component 210, a proximity signal from at least one RFID reader 100 when the RFID component 210 is within a predetermined range of the at least one RFID reader 100 (step S101). The method also includes storing the proximity signal in a memory device 212 of the RFID component 210 (step S103). The method further includes executing, by a hardware processor 204 of the mobile computing device 200, computer-readable instructions tangibly recorded on a memory device 208 of the mobile computing device 200, the executed instructions controlling at least one operation of the mobile computing device 200 in accordance with the proximity signal received by the transceiver 220 of the RFID component 210 from the at least one RFID reader 100 (step S105).

In an exemplary embodiment, a non-transitory computer-readable storage medium (e.g., memory 208) stores instructions which, when executed by the hardware processor 204 of the mobile computing device 200, cause the hardware processor 204 to perform a method for controlling at least one operation of the mobile computing device 200. The method includes receiving a proximity signal from the transceiver 220 of the RFID component 210 communicatively connected to the mobile computing device 200, the transceiver 220 receiving the proximity signal when the RFID component 210 is within a predetermined range of at least one RFID reader 100. Communicatively connected means, for example, that the mobile computing device 200 and RFID component 210 can communicate with each other by any type of communication means, for example, via a signal transmission means such as a wire, bus, etc. or wirelessly via Wi-Fi, Bluetooth, NFC, etc. The method can also include executing, by the hardware processor 204 of the mobile computing device 200, the instructions stored on the non-transitory computer-readable storage medium (memory 208) of the mobile computing device 200, the executed instructions controlling the at least one operation of the mobile computing device 200 in accordance with the proximity signal received by the transceiver 220 of the RFID component 210 from the at least one RFID reader 100.

In an exemplary embodiment, a non-transitory computer-readable storage medium (e.g., memory 212) stores instructions which, when executed by the hardware processor 214 located in the RFID component 210 communicatively connected to the mobile computing device 200, cause the hardware processor 214 to perform a method for controlling at least one operation of the mobile computing device 200. The method includes receiving, by the transceiver 220 of the RFID component 210, a proximity signal when the RFID component 210 is within a predetermined range of at least one RFID reader 100. The method can also include storing the proximity signal in the non-transitory computer-readable storage medium (memory 212) of the RFID component 210, the non-transitory computer-readable storage medium of the RFID component 210 having a control policy for the mobile computing device 200. The control policy including, for example, identifications of operations of the mobile computing device 200 which are performable based on the received proximity signal. The method can also include comparing the proximity signal to the control policy, determining which operations of the mobile computing device 200 are permitted to be performed based on the comparison, and generating an operation signal identifying the operations of the mobile computing device 200 which are determined to be performable. The method can also include transmitting the operation signal, to a hardware processor 204 of the mobile computing device 200, to control at least one operation of the mobile computing device 200 in accordance with the operation signal transmitted to the mobile computing device 200.

The above-described method can perform any of the operations of the mobile computing device 100 and the RFID component 210 as described herein. Furthermore, the above-described non-transitory computer-readable storage medium of the mobile computing device 200 and RFID component 210 can store instructions which cause the respective hardware processor(s) of those devices to respectively perform the operative functions of the mobile computing device 200 and RFID component as described herein.

Figure 4:
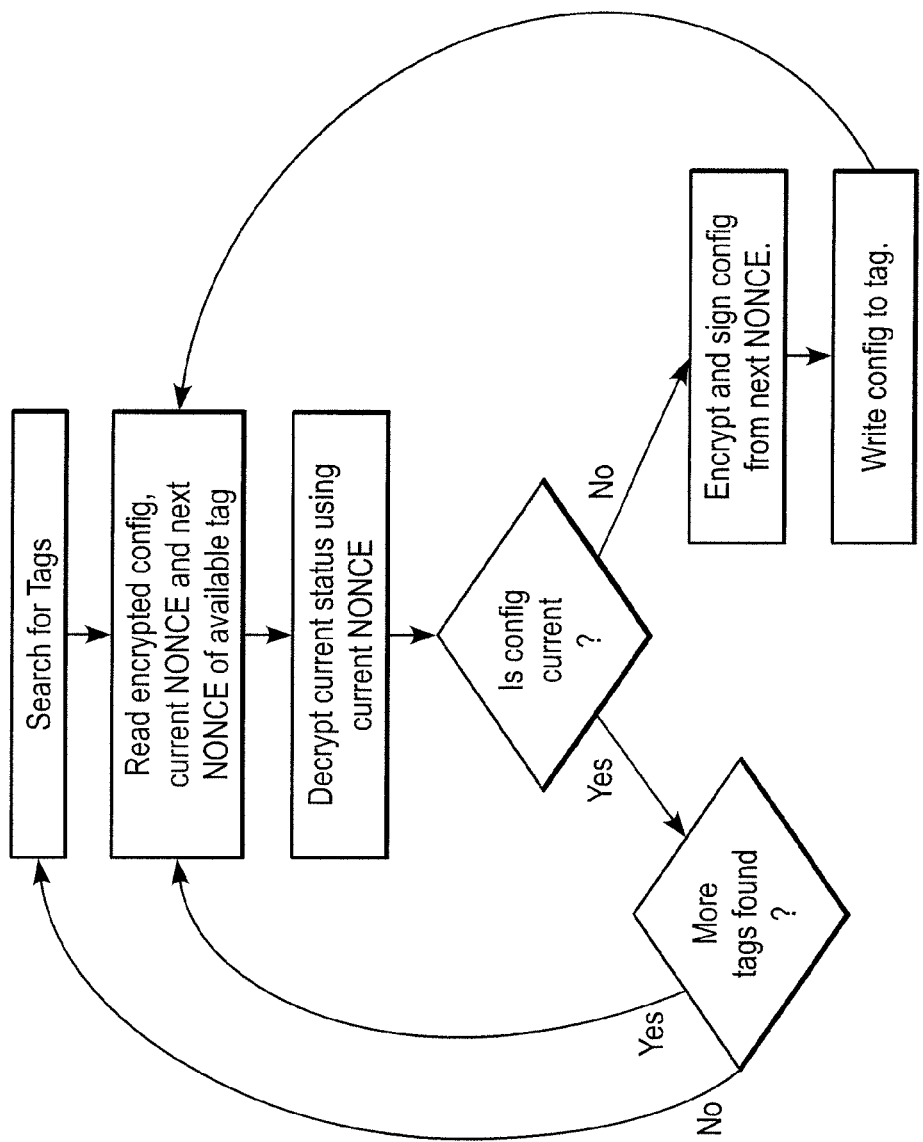
FIG. 4 is a flow chart illustrating a method according to an exemplary embodiment.

FIG. 4 is a flow chart diagram illustrating operations performed by an RFID reader 100 according to an exemplary embodiment of the present disclosure. According to an exemplary embodiment, the RFID reader 100 has a hardware processor 300 (e.g., CPU) configured to execute computer-readable software tangibly recorded in a non-transitory computer-readable recording medium 302 of the RFID reader 100. Executing the software, the hardware processor 300 constantly scans for available RFID components 210 (i.e., RFID components 210 in proximity to the RFID reader 100). An RFID component 210 can be in proximity of the reader when it is, for example, within a radius of several feet or meters. When the hardware processor 300 finds a RFID component 210, it begins a secure and signed transaction with the RFID component 210. The RFID component 210 transmits its current configuration and two random NONCE that are used to generated cryptographic keys and signatures. One NONCE is used to encrypt and sign the current configuration and location data, and the other is used to encrypt and sign any data that is pushed to the RFID component 210. The RFID reader 100, upon finding a RFID component 210, checks the current configuration, and validates it against what it thinks the configuration should be. If there is a discrepancy, the hardware processor 300 of the RFID reader 100 pushes the configuration and then re-rereads the tag to verify it was written correctly.

Figure 5:
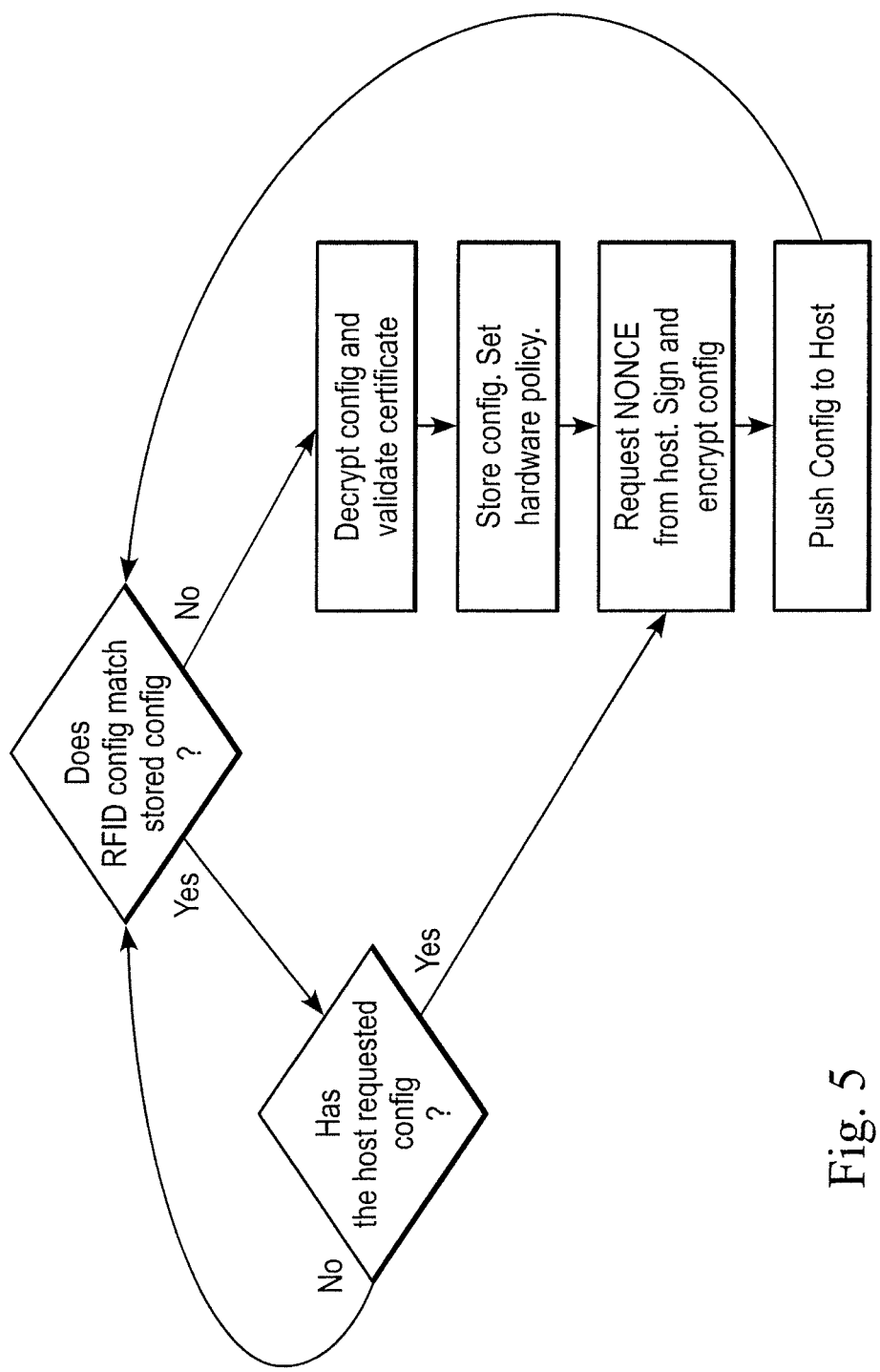
FIG. 5 is a flow chart illustrating a method according to an exemplary embodiment.

FIG. 5 is a flow chart diagram illustrating operations performed by the hardware processor 204 of the RFID component 210 according to an exemplary embodiment of the present application. In an exemplary embodiment, the RFID component 210 is a passive tag with an active low power processor enabling cryptographic functionality. In its memory 212, the RFID component 210 stores its current configuration (e.g., control policy) and two NONCEs for the RFID reader 100 to read. If the RFID component 210 receives an updated configuration from the RFID reader 100, it verifies the signature, decrypts the configuration and pushes it to the mobile computing device 200. If the mobile computing device 200 requests the current configuration at any point, it will also push the configuration.

Figure 6:
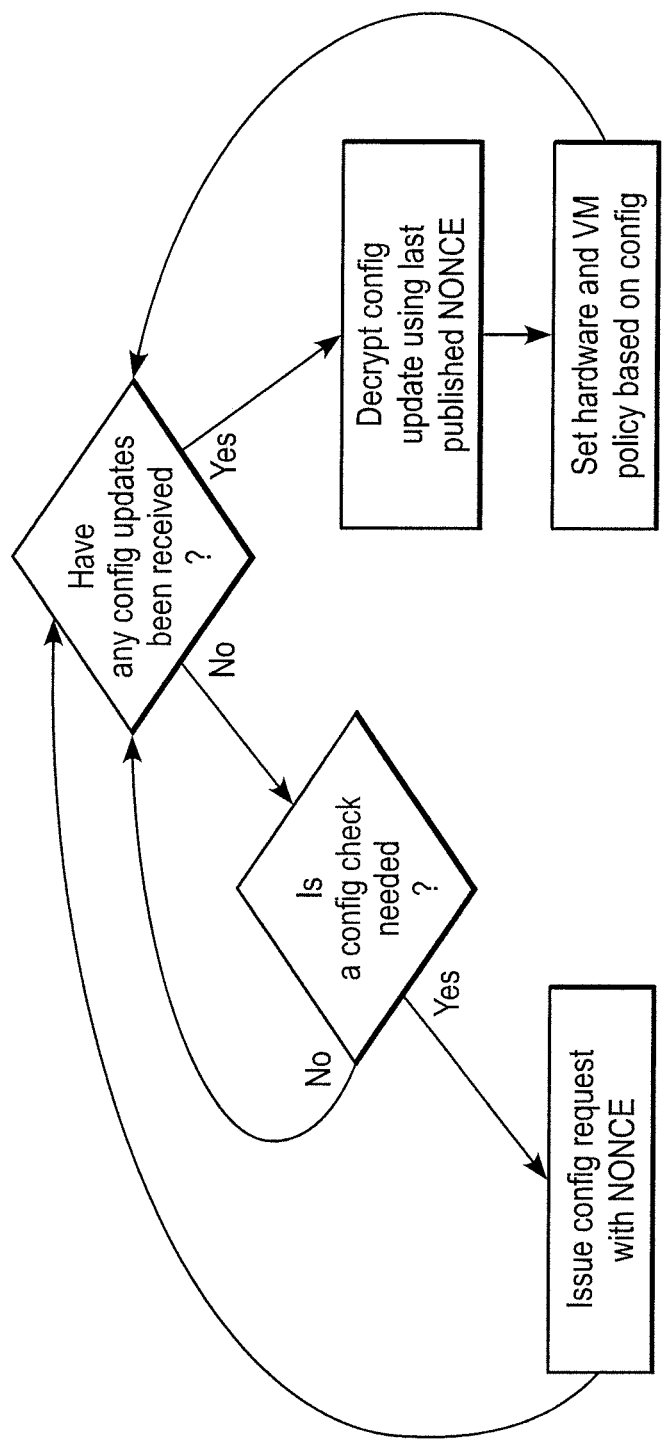
FIG. 6 is a flow chart illustrating a method according to an exemplary embodiment.

FIG. 6 is a flow chart diagram illustrating operations performed by the hardware processor 204 of the mobile computing device 200 according to an exemplary embodiment of the present disclosure. The hardware processor 204 of the mobile computing device 200 executes a software program dedicated to interfacing with the RFID component 210. The execution of this software monitors any pushed configurations from the RFID component 210, decrypts them, and checks the signatures on them before setting up the policy locally on the mobile computing device 200. When the mobile computing device 200 is started (i.e., powered on), on boot the software requests the current status (e.g., control policy) from the RFID component 210 to set the initial boot policy.

Figure 7:
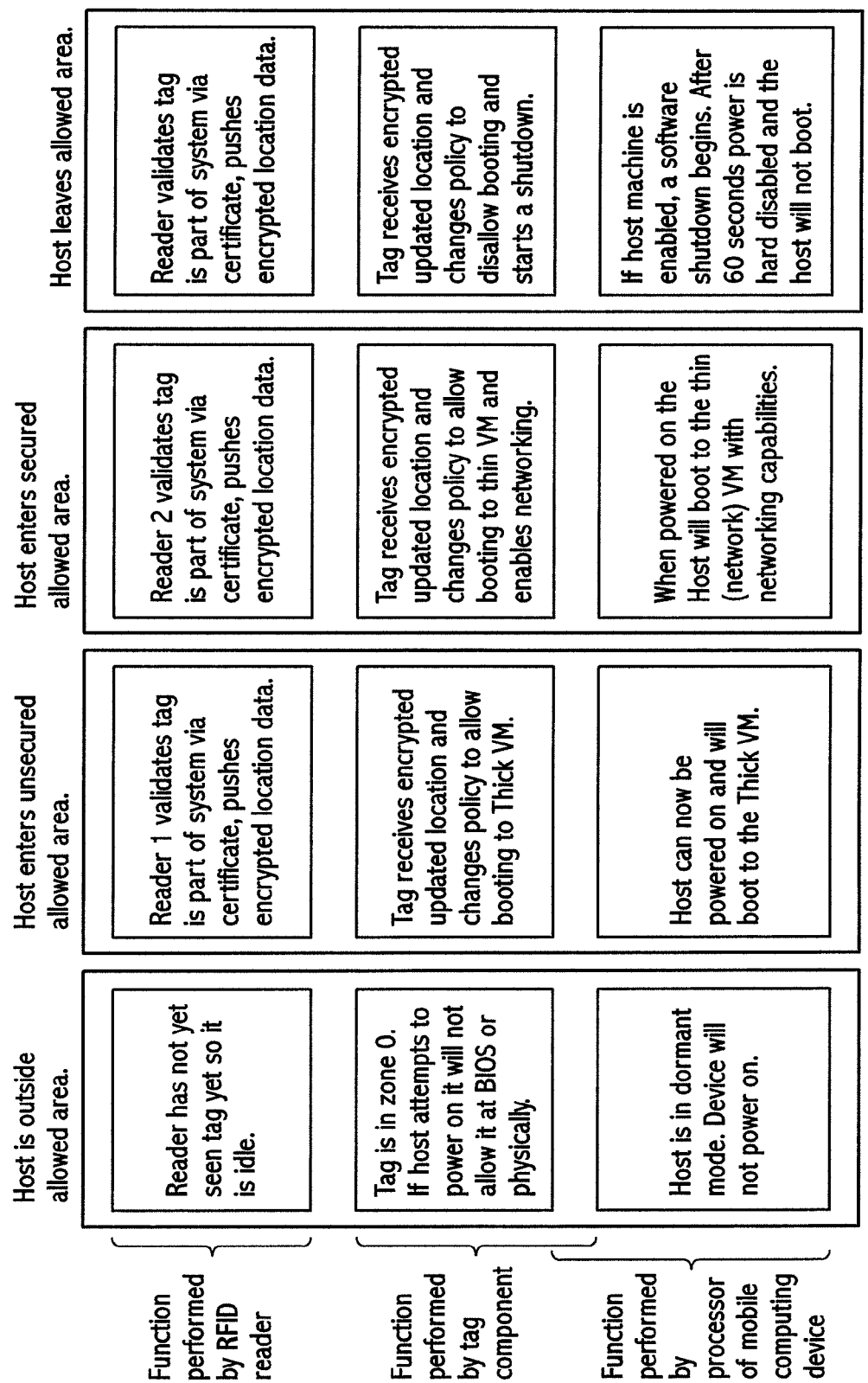
FIG. 7 is a chart illustrating exemplary functions performed by the devices of the system.

The present disclosure provides that different operations can be performed with the mobile computing device 200 based on the mobile computing device's 200 presence in different areas having different security designations. FIG. 7 is a diagram illustrating exemplary scenarios according to the present disclosure in which the mobile computing device 200 (abbreviated as "host") is outside an allowed area, enters an unsecured allowed area, enters a secured allowed area, and leaves an allowed area. For each of these areas, FIG. 7 illustrates the operations performed by the RFID reader 100 (top block), the RFID component 210 (middle block) and the hardware processor 204 of the mobile computing device 200 (lower block) executing the above-described software dedicated to interfacing with the RFID component 210.

While various exemplary embodiments of the disclosed system and method have been described above, it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

As can be seen above, the application providing method and system can be implemented in any number of ways as discussed above, or as will become apparent to those skilled in the art after reading this disclosure. These embodiments, as well as variations and modifications thereof, which will occur to those skilled in the art, are encompassed by the application providing method and system. Hence, the scope of the application providing method and system is limited only by the metes and bounds as articulated in the claims appended hereto.

What is claimed is:

1. A mobile computing device, comprising:
   a first memory device having first computer-readable instructions tangibly recorded thereon;
   a first hardware processor configured to execute the first computer-readable instructions recorded on the first memory device; and
   an RFID component that includes a transceiver configured to receive a proximity signal from at least one RFID reader when the RFID component is within a predetermined range of the at least one RFID reader, and a second memory device configured to store the proximity signal,
   wherein the first hardware processor is configured to, upon executing the instructions recorded on the first memory device, enable access to at least one operation of the mobile computing device in accordance with the proximity signal received by the transceiver of the RFID component from the at least one RFID reader when the transceiver of the RFID component receives the proximity signal while the RFID component is within the predetermined range of the at least one RFID reader, and disable access to the at least one operation of the mobile computing device when the transceiver of the RFID component does not receive the proximity signal while the RFID component is not within the predetermined range of the at least one RFID reader, and
   wherein the proximity signal stored in the second memory device of the RFID component includes a control policy identifying the at least one operation of the mobile computing device that the mobile computing device is enabled to access when the RFID component receives the proximity signal while the RFID component is within the predetermined range of the at least one RFID reader, and disabled to access when the RFID component does not receive the proximity signal while the RFID component is not within the predetermined range of the at least one RFID reader.

2. The mobile computing device of claim 1, wherein the first hardware processor is configured to, in enabling or disabling access to the at least one operation of the mobile computing device, at least one of:
   control at least one hardware component of the mobile computing device;
   control at least one operating system recorded on the first memory device;
   control at least one hypervisor recorded on the first memory device; and
   control at least one application program executable on the mobile computing device.

3. The mobile computing device of claim 1, wherein the control policy includes identifications of operations of the mobile computing device that are performable, and
   wherein the first hardware processor is configured to, based on the control policy, enable or disable access to at least one of an executable application stored in the first memory device, a file stored in the first memory device, at least one operating system of the mobile computing device, and a peripheral hardware component with which the mobile computing device is configured to communicate.

4. A system comprising:
   the mobile computing device of claim 1; and
   at least one RFID reader configured to communicate wirelessly with the RFID component of the mobile computing device and transmit the proximity signal to the RFID component of the mobile computing device when the RFID component is within the predetermined range.

5. The mobile computing device of claim 1, wherein the predetermined range is at least one meter to approximately 20 meters.

6. The mobile computing device of claim 1, wherein the proximity signal includes location-related data indicating a current physical location of at least one of the RFID component and the at least one RFID reader.

7. The mobile computing device of claim 6, wherein the first memory device has recorded thereon the control policy for the mobile computing device, the control policy including identifications of operations of the mobile computing device which are performable based on the physical location of the mobile computing device, and
wherein the first hardware processor is configured to compare the location-related data with the control policy, and determine which operations of the mobile computing device are permitted to be performed based on the comparison.

8. The mobile computing device of claim 7, wherein, based on the comparison of the location-related data with the control policy, the first hardware processor is configured to control a power state of the mobile computing device.

9. The mobile computing device of claim 7, wherein, based on the comparison of the location-related data with the control policy, the first hardware processor is configured to control access to at least one hardware component of the mobile computing device.

10. The mobile computing device of claim 7, wherein, based on the comparison of the location-related data with the control policy, the first hardware processor is configured to enable or disable access to at least one of an executable application stored in the first memory device, a file stored in the first memory device, at least one operating system of the mobile computing device, and a peripheral hardware component with which the mobile computing device is configured to communicate.

11. The mobile computing device of claim 7, wherein at least one of the control policy and the proximity signal are encrypted using an AES-256 GCM algorithm and signed with an ECDSA Curve P-385 signature.

12. The mobile computing device of claim 7, wherein the transceiver of the RFID component is configured to receive an update signal from the at least one RFID reader, the update signal containing an update to at least one of the identifications included in the control policy recorded on the first memory device, and
wherein the first hardware processor is configured to update the control policy recorded in the first memory device in accordance with the update contained in the update signal.

13. A system comprising:
the mobile computing device of claim 12;
at least one RFID reader configured to communicate wirelessly with the RFID component of the mobile computing device and transmit the proximity signal to the RFID component of the mobile computing device when the RFID component is within the predetermined range; and
at least one server configured to transmit the update signal to the RFID reader for updating the control policy recorded on the first memory device when the mobile computing device is in communicative range with the RFID reader.

14. The mobile computing device of claim 6, wherein the second memory device has recorded thereon second computer-readable instructions and a control policy for the mobile computing device, the control policy including identifications of operations of the mobile computing device which are performable based on the location-related data of the received proximity signal.

15. The mobile computing device of claim 14,
wherein the RFID component includes a second hardware processor configured to execute the second computer-readable instructions recorded on the second memory device, compare the location-related data with the control policy, determine which operations of the mobile computing device are permitted to be performed based on the comparison, and generate an operation signal identifying the operations of the mobile computing device which are determined to be performable,
wherein the RFID component is configured to transmit the operation signal to the first hardware processor of the mobile computing device, and
wherein the first hardware processor is configured to control the at least one operation of the mobile computing device in accordance with the operation signal received from the transceiver of the RFID component.

16. The mobile computing device of claim 15, wherein, based on the operation signal received from the transceiver of the RFID component, the first hardware processor is configured to control a power state of the mobile computing device.

17. The mobile computing device of claim 15, wherein, based on the operation signal received from the transceiver of the RFID component, the first hardware processor is configured to control access to at least one hardware component of the mobile computing device.

18. The mobile computing device of claim 15, wherein, based on the operation signal received from the transceiver of the RFID component, the first hardware processor is configured to enable or disable access to at least one of an executable application stored in the first memory device, a file stored in the first memory device, at least one operating system of the mobile computing device, and a peripheral hardware component with which the mobile computing device is configured to communicate.

19. The mobile computing device of claim 15, wherein the transceiver of the RFID component is configured to receive an update signal from the at least one RFID reader, the update signal containing an update to at least one of the identifications included in the control policy recorded in the second memory device, and
wherein the second hardware processor is configured to update the control policy recorded in the second memory device in accordance with the update contained in the update signal.

20. A system comprising:
the mobile computing device of claim 19;
at least one RFID reader configured to communicate wirelessly with the RFID component of the mobile computing device and transmit the proximity signal to the RFID component of the mobile computing device when the RFID component is within the predetermined range; and
at least one server configured to transmit the update signal to the at least one RFID reader for updating the control policy recorded in the second memory device when the mobile computing device is in communicative range with the at least one RFID reader.

21. A method for controlling at least one operation of a mobile computing device, the method comprising:
receiving, by a transceiver of an RFID component, a proximity signal from at least one RFID reader when the RFID component is within a predetermined range of the at least one RFID reader;

storing the proximity signal in a first memory device of the RFID component; and executing, by a first hardware processor of the mobile computing device, first computer-readable instructions tangibly recorded on a second memory device of the mobile computing device, the executed instructions enabling access to the at least one operation of the mobile computing device in accordance with the proximity signal received by the transceiver of the RFID component from the at least one RFID reader when the transceiver of the RFID component receives the proximity signal while the RFID component is within the predetermined range of the at least one RFID reader, and disabling access to the at least one operation of the mobile computing device when the transceiver of the RFID component does not receive the proximity signal while the RFID component is not within the predetermined range of the at least one RFID reader, wherein the proximity signal stored in the first memory device of the RFID component includes a control policy identifying the at least one operation of the mobile computing device that the mobile computing device is enabled to access when the RFID component receives the proximity signal while the RFID component is within the predetermined range of the at least one RFID reader, and disabled to access when the RFID component does not receive the proximity signal while the RFID component is not within the predetermined range of the at least one RFID reader.

22. The method of claim 21, wherein the predetermined range is at least one meter to approximately 20 meters.

23. A non-transitory computer-readable storage medium storing instructions which, when executed by a hardware processor of a mobile computing device, cause the hardware processor to perform a method for controlling at least one operation of the mobile computing device, the method comprising:

receiving a proximity signal from a transceiver of an RFID component communicatively connected to the mobile computing device, the transceiver receiving the proximity signal when the RFID component is within a predetermined range of at least one RFID reader;

storing the received proximity signal in a memory device of the mobile computing device; and executing, by the hardware processor of the mobile computing device, the instructions stored on the non-transitory computer-readable storage medium of the mobile computing device, the executed instructions enabling the at least one operation of the mobile computing device in accordance with the proximity signal received by the transceiver of the RFID component from the at least one RFID reader when the transceiver of the RFID component receives the proximity signal while the RFID component is within the predetermined range of the at least one RFID reader, and disabling access to the at least one operation of the mobile computing device when the transceiver of the RFID component does not receive the proximity signal while the RFID component is not within the predetermined range of the at least one RFID reader, wherein the proximity signal stored in the memory device of the RFID component includes a control policy identifying the at least one operation of the mobile computing device that the mobile computing device is enabled to access when the RFID component receives the proximity signal while the RFID component is within the predetermined range of the at least one RFID reader, and disabled to access when the RFID component does not receive the proximity signal while the RFID component is not within the predetermined range of the at least one RFID reader.

24. The non-transitory computer-readable recording medium of claim 23, wherein the predetermined range is at least one meter to approximately 20 meters.

25. A non-transitory computer-readable storage medium storing instructions which, when executed by a hardware processor located in an RFID component communicatively connected to a mobile computing device, cause the hardware processor to perform a method for controlling at least one operation of the mobile computing device, the method comprising:

receiving, by a transceiver of the RFID component, a proximity signal when the RFID component is within a predetermined range of at least one RFID reader;

storing the proximity signal in the non-transitory computer-readable storage medium of the RFID component, the non-transitory computer-readable storage medium of the RFID component having a control policy for the mobile computing device, the control policy including identifications of operations of the mobile computing device which are performable based on the received proximity signal;

comparing the proximity signal to the control policy, determining which operations of the mobile computing device are permitted to be performed based on the comparison, and generating an operation signal identifying the operations of the mobile computing device which are determined to be performable;

transmitting the operation signal, to a second hardware processor of the mobile computing device, to enable access to at least one operation of the mobile computing device in accordance with the operation signal transmitted to the mobile computing device when the transceiver of the RFID component receives the proximity signal while the RFID component is within the predetermined range of the at least one RFID reader; and disabling access to the at least one operation of the mobile computing device when the transceiver of the RFID component does not receive the proximity signal while the RFID component is not within the predetermined range of the at least one RFID reader.

* * * * *